(No Model.) 2 Sheets—Sheet 1.
G. W. SHARP.
AUTOMATIC GRAIN METER.
No. 286,645. Patented Oct. 16, 1883.
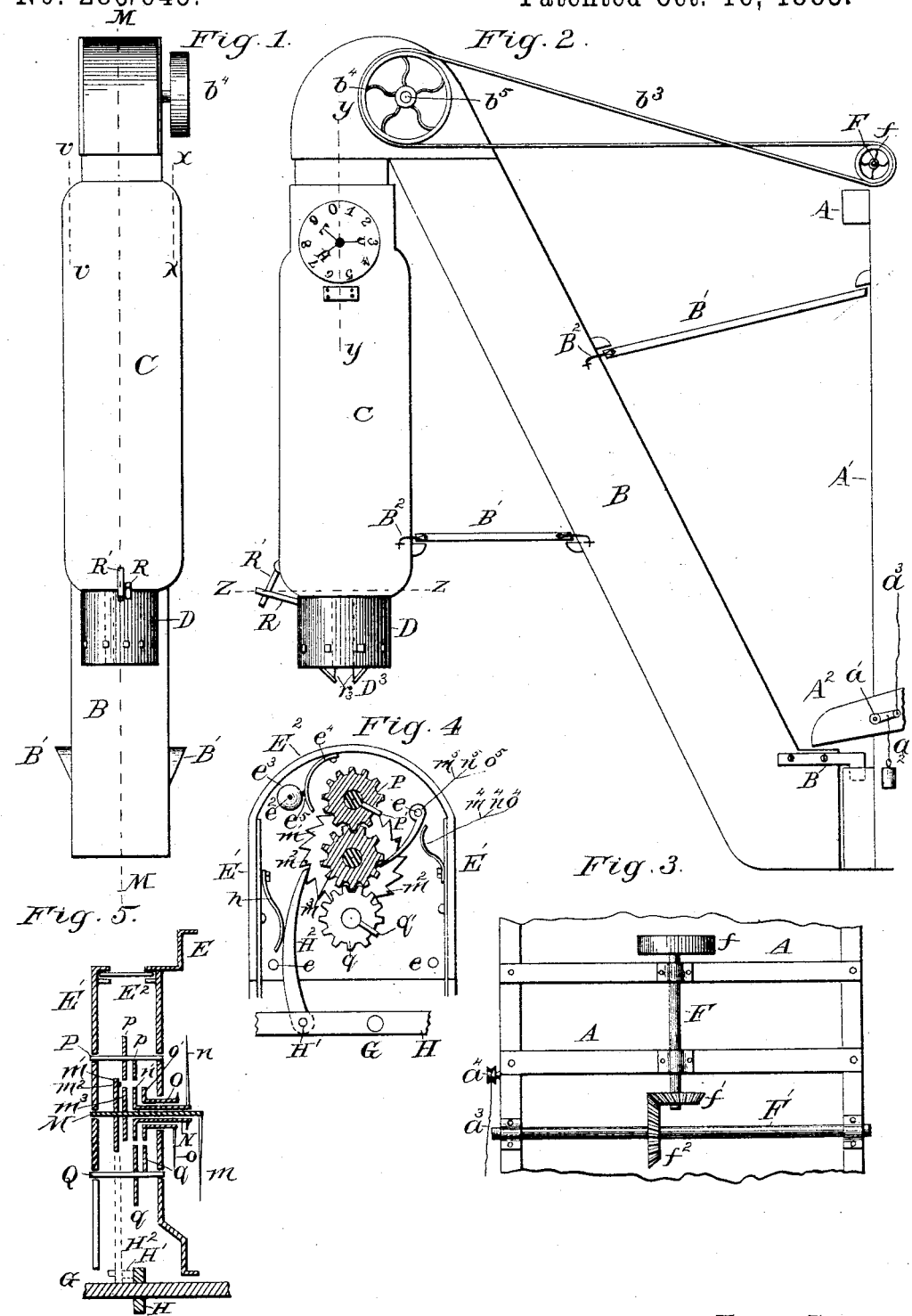
Witnesses
Inventor:
George W. Sharp.

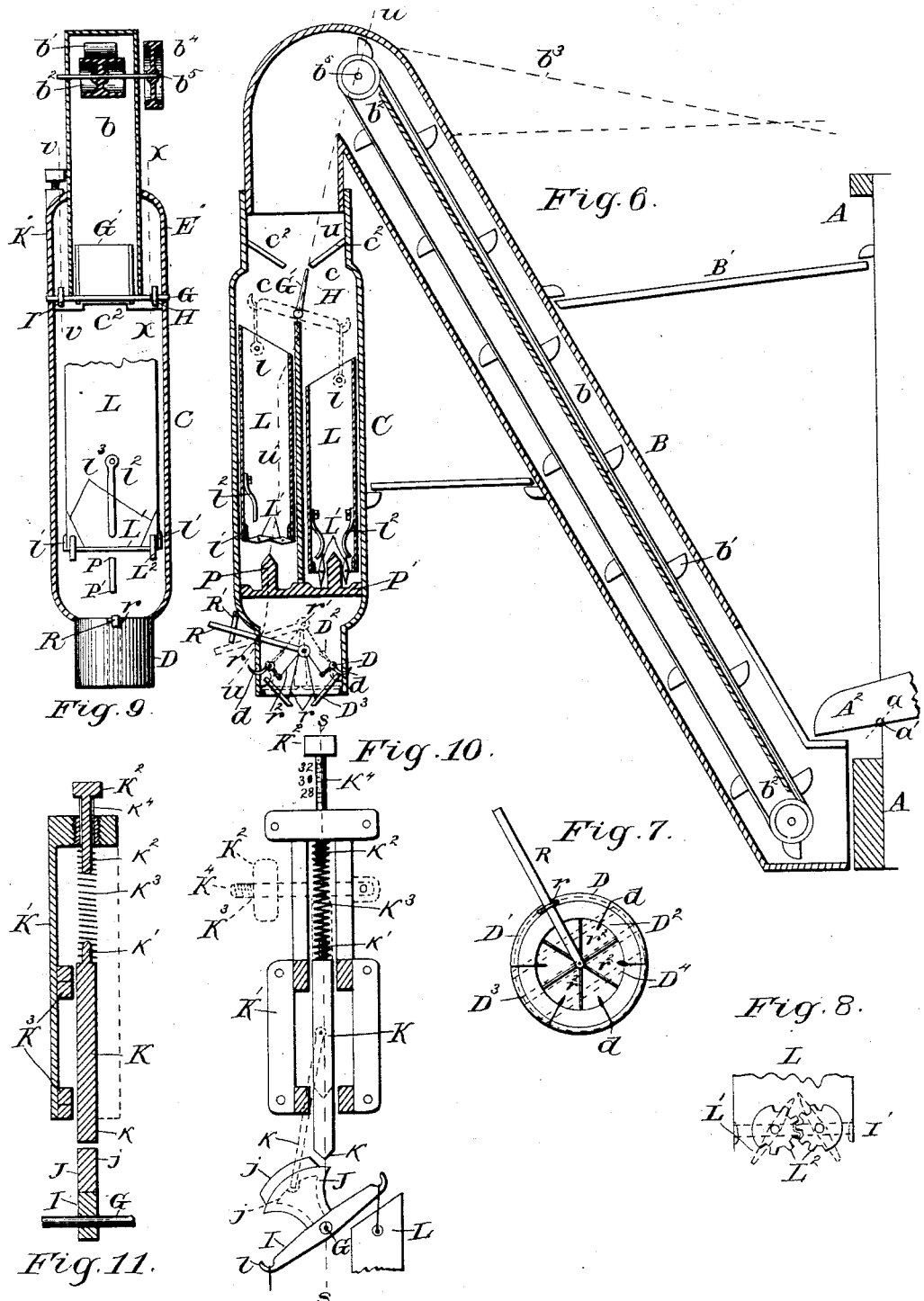

UNITED STATES PATENT OFFICE.

GEORGE W. SHARP, OF CRAWFORDSVILLE, INDIANA.

AUTOMATIC GRAIN-METER.

SPECIFICATION forming part of Letters Patent No. 286,645, dated October 16, 1883.

Application filed April 5, 1883. (No model.)

*To all whom it may concern:*

Be it known that I, GEORGE W. SHARP, of Crawfordsville, in the county of Montgomery and State of Indiana, have invented certain new and useful Improvements in Automatic Grain-Meters, of which the following is a specification.

The invention relates, principally, to that class of machinery used for measuring and registering the grain from thrashing-machines, wherein the grain desired to be measured is first elevated somewhat by mechanism driven by the moving parts of the machine, and then allowed to fall through a measuring-box containing two similar buckets suspended on opposite sides of a rocking shaft, so as to oscillate vertically, and adapted to alternately be held up by certain weighing devices connected with the said shaft or the bucket-supports until a definite amount of grain falls into the upper bucket, which overcomes the weighing mechanism and causes the filled bucket to descend, raise the emptied bucket, change the stream of grain into it, and itself encounter mechanism connected with the lower end of the measuring-box which shall open the valves which constitute its bottom and discharge the grain into a bin, or a grain-bag suitably attached to it, while a system of registering mechanism is made to keep a correct tally, and show at all times, by means of indices moving over its dial or face, the amount measured, while an alarm-bell is made to give notice of the filling of each grain-bag by a single stroke of its hammer, there being also arrangements for closing the lower end of the bag-holder while removing and tying the filled grain-bags, which all are left open when discharging into a bin; and hence many of its principles are equally applicable to the measurement of grain in elevators and warehouses and from corn-shellers.

The object of my invention is to devise a system of automatic mechanism that shall elevate the grain which it is desired to measure to a convenient height for its purposes, measure it uniformly and correctly, keep an accurate and continuous register of the amount measured, and drop the measured grain into the desired receptacle. This object is accomplished by certain arrangements and combinations of parts, which will hereinafter be more fully described.

In the accompanying drawings, which are made a part hereof, and on which similar letters of reference indicate similar parts, Figure 1 is a front elevation of my device when in position to receive the grain from a thrashing-machine; Fig. 2, a side elevation of the same; Fig. 3, a plan view of a portion of the top of a thrashing-machine, showing the arrangement of the driving mechanism of my attachment; Fig. 4, a vertical section of the register on the dotted line $x\,x$ in Fig. 1; Fig. 5, a vertical section of the same on the dotted line $y\,y$ in Fig. 2; Fig. 6, a longitudinal vertical section on the dotted line $w\,w$ in Fig. 1; Fig. 7, a horizontal section of the bag-holder on the dotted line $z\,z$ in Fig. 2; Fig. 8, a view of the intermeshing gearing of the butterfly-valves which form the bottoms of the buckets L L; Fig. 9, a transverse section on the dotted line $u\,u\,u\,u$ in Fig. 6, which varies its plane to exhibit desired parts; Fig. 10, a vertical section of a portion of the mechanism on the dotted line $v\,v$ in Figs. 1 and 9; and Fig. 11, a transverse section of the same on the dotted line $s\,s$, Fig. 10, the plane of which is coincident with that of the dotted line $y\,y$ in Fig. 2.

In said drawings, the portions marked A represent portions of an ordinary separator, whereunto my device is usually attached; B, the elevator; C, the measurer; D, the bag-holder; E, the register; F, the driving-shaft; G, the rocking shaft; H and I, the weighing-arms; J, a projection from G; K, a fluctuating reversible obstruction of J; L, the buckets; L', the butterfly-valves forming the bottoms of the buckets; P, the projecting blades that open them, and R the lever by which the mechanism of the bag-holder is operated.

The elevator, its attachment to the separator, its driving mechanism, and the general construction and arrangement of the registering mechanism, being very similar to such arrangements known and used in other such machinery, will not require further description herein than the incidental mention that may be made of them in describing other parts.

C is a rectangular box inclosing the buckets and weighing mechanism, and adapted to be suspended from an elevated grain-spout.

It has two principal compartments, c c, separated by the partition c'. The shelf-like projections c² c² direct the grain into the mechanism below them.

D and E will hereinafter be explained.

G is a transverse shaft having its bearings in the sides of C, and rocking upon its axis as the buckets alternately descend, which causes the vibrating door G', attached thereunto, to alternately open and close the passages into the duplicate buckets L L.

H and I are essentially similar levers pivoted on the axis of G, near its extremities, and support the buckets L L jointly, which are thus adapted to ascend alternately to be filled with grain, and then descend and discharge it. The buckets L L are preferably made of sheet metal, and each of size to contain some more than half a bushel, and are suspended on the levers H and I at equal distances from the axis of the shaft G by the links l l, and are open at the top to receive the grain, and have self-adjusting bottoms, preferably in the form of two butterfly-valves, L', placed parallel with the longest edges of the bucket-bottom, and having their bearings in l'—the thickened edges of L—and having their inner wings somewhat longer than their outer wings, and being provided with intermeshing gear L², Fig. 8, and opening back against the springs l² l². Said valves are thus insured a proper and simultaneous movement that effectually opens and closes the bottoms of said buckets at the desired time. l³ is a guard to keep the grain out of the gear of the valves. These cogged segments L² and the guards l³ are not essential to the operation of the valves L'. These butterfly-valves are simply thin rectangular slats with projections from near the middle of their ends, forming journals upon which the slats revolve sufficiently to entirely open and entirely close the lower ends of the buckets. Two of them form the bottom of each bucket by lying edge to edge, with their inner and longer wings free, while their outer and shorter wings project slightly under the edge of the bucket to prevent them from rising when the bucket contains grain, which thus bears heaviest on the inner wings, from the greater extent of surface which they contain. When the buckets descend, the fixed projecting blades P P, which are arranged transverse to the axes of all these valves and immediately below them, force the valves open as their axes pass downward on opposite sides of that device, which, from its width, holds them vertically edgewise, and thus completely opens the whole lower end of the bucket for the exit of the grain. When the emptied bucket is raised off the blade P by the descent of the other, its valves are closed by the elasticity of the springs l² l² and again assume a horizontally edgewise position, and thus completely close the bottom of the bucket for the reception of more grain.

P P are pointed blades projecting from the transverse bar P', which is rigidly fixed to the partition and sides of C, and thus held in position to arrest the descent of the bucket as soon as the pointed blade P has been made to penetrate it far enough to open the valves, as shown in the bucket at the right in Fig. 6, to discharge its contents. When the bucket is raised off the blade, the valves will assume the position shown in the bucket at the left in Fig. 6, closing the bottom to receive another measure of grain. The buckets are alternately held up by the engagement of J and K until filled, then allowed to descend onto the blades P, and become empty again, gravity operating them.

The amount of grain passing through the buckets is estimated by weight, and is ascertained by connecting with the shaft G a projection, J, as shown by the solid lines in Fig. 10, which, being secured to G at one end, vibrates at the other in an unvarying path as G rocks upon its axis. This projection has a reduced extension, j, at its outer end, which is similarly beveled at each of its outer angles, so as to form a reversible point, by means of which it engages with K, and when it encounters K at each of its successive vibrations, from K's being thrust into its path, and force enough is applied to J by the weight of the grain in the suspended bucket to cause it to overcome K, it will of itself force K out of its path by acting upon it upon the principle of an inclined plane, and will then entirely pass it, and again encounter it in a reversed relation in its returning vibration. In this arrangement the minimum amount of friction from the engagement of J and K which it is practicable to reach is contemplated. As the force exerted upon K by J is proportional to the weight of the grain in the suspended bucket, it is easy to adjust K so as to ascertain the amount thereof, and registering mechanism to take account of it. The buckets, being of equal weight, balance each other, and do not interfere with this method of weighing the grain.

K is a fluctuating reversible obstruction of J, consisting, essentially, of an endwise-oscillating bar mounted in suitable bearings or guides, preferably Babbitted processes, inside a shell-like device, K', which is screwed onto the adjacent surface of the measuring-box C in convenient relation to J and K. The other end of K' is bored and threaded to form a bearing for the set-screw K², which is an ordinary set-screw driven into its bearing by ordinary means, so as to form an adjustable rigid rest for the coil-spring $k^3$, which is mounted upon reduced extension, of K and K², so that as the rest K² is driven forward onto it, its elasticity causes it to operate to force K outward and into the path of J with an obstructing capacity proportional to the strength and tension of the spring, which is governed by the position of the rest K² sufficiently for my purpose. The position of the screw is accurately shown by means of a graduated scale, $k^4$, adapted to the purpose, and marked on the shaft of the screw, as shown in Fig. 10, or else on the adjacent surface of the measuring-box just back of it, or else on the surface of the device K', as may be most convenient or desirable. K has a reversible point, by means of which it engages with J, the normal position of which, when adjusted, is in the path of J's vibration, so that it will be encountered by J in each of its vibrations, and will resist the said vibrations of J until force enough is applied to J by the weight of the aforesaid grain to overcome the elasticity of the spring $k^3$, when K will of itself yield to the pressure of J, and allow J to force it out of its path and entirely pass it. Then, immediately readjusting itself, it will oppose in like manner, but in reversed relation, its returning vibration, and so on repeatedly. Thus it forms a reversible fluctuating obstruction of known and governable capacity, whereby the amount of grain passing through the measuring-box may be definitely ascertained.

My principle admits of such various methods of application, each having some advantages, that I briefly describe one or more equivalents. The upper system of dotted lines in Fig. 10 illustrates the substitution of a weighted graduated lever for the set-screw and coil-spring, in which the corresponding elements are designated by similar letters made of dotted lines. The lower system of dotted lines in Fig. 10 illustrates the engaging mechanism of J and K in the form of a toggle-joint, with the corresponding elements marked by similar letters in dotted lines. Also, K may consist of a horizontal bar flexibly fixed above J, the longitudinal oscillations of which by J would move its reversible obstructing projection out of the arc of the path of J in the direction of a tangent. Other variations are known and easily devised; but the foregoing fully illustrates the principle of this part of my invention as claimed.

The bag-holder D is a reduced and rounded extension of the measurer C, and is usually made of sheet metal. It is provided with a series of sharply-pointed projections, $d$, which operate to hold the grain-bags thereon. These projections are usually made somewhat in the form of bell-cranks, and are pivoted at their angle to the inside of D. These pivots D' may be a wire extending clear around, as in Fig. 7. A similar wire, $D^2$, of smaller curve, is connected with one arm of the bell-cranks, to operate them simultaneously, and is connected with the inner end of the lever R by the rods $r^2$. The other ends of the bell-crank hooks extend downward, and are curved outwardly, and adapted to be thrust outward through openings in D and seize and hold the grain-bags placed thereon to receive the grain. The lever R is pivoted to D, so that as its outer end is moved by hand and held in position by the swinging pawl R' the inner end operates and holds both the hooks $d\ d$ and the butterfly-valves $D^3$, which valves are connected with it by the wires $r^3$, fastened to their inner wings. These inner wings having a greater area than the outer ones, will, when unsupported, descend, from the greater weight on them, and revolve the valves sufficiently to open the passage for the exit of the grain by turning them on their axes $D^4$, which have their bearings in the sides of D. The solid lines in Fig. 6 show the various parts of this mechanism in the proper position to hold a grain-bag and discharge grain into it; and the dotted lines in Fig. 6 show them in a reversed position, as in removing the grain-bag and disposing of and replacing it, in which the valves $D^3$ will support any measured grain that may be dropped onto them.

By my arrangement the measured grain may be discharged into a bin or wagon-bed, in which case the outer end of R is held up by the notch in the side of R', and these valves are open.

The register is located above the shaft G and its arm H, and secured to the side of the measuring-box, and is operated by means of the pawl $H^2$, one end of which being pivoted to the arm H and the other engaging with the notches on the ratchet-wheel of the center post, M, it will turn the said post or shaft one-tenth of a revolution for each alternate discharge of a bucket of grain, and thus show, by means of its index $m$ and the numbered dial E, that one bushel has been measured. Then by a system of well-understood registering mechanism, plainly illustrated in my drawings, Figs. 4 and 5, this shaft is made to turn the two similarly-provided shafts N and O at a requisite rate to show the tens and hundreds of bushels measured. A small bell, $e^3$, may be made to accompany the register, and be made to ring periodically by placing pins $m^2$ on the sides of the ratchet-wheel, so as to engage with the spring $e^4$, which bears and operates the hammer $e^5$.

In the ordinary use and operation of my invention the measuring-box C is suspended on a grain-spout by grappling-hooks, or by any other convenient means, and the grain is discharged into it, $c^2\ c^2$ directing it onto the door G', which directs it into the raised bucket L until the weight thereof overcomes the resistance afforded J by K, and K recedes, allowing the bucket to descend with a weighed half-bushel of grain, which raises the other bucket, reverses the engagement of J and K to hold it up, turns the door G' so as to direct the stream of grain into it, and draws the pawl $H^2$ back and engages it with another notch of the ratchet-wheel and continues to descend until it is arrested by the bar P', just previous to which it will have encountered the blade P, which, entering it betwixt the butterfly-valves L', forces them open and allows the grain to fall into the provided receptacle. The other bucket, becoming filled, makes a movement exactly similar to this, except that it pushes the pawl forward, and thus registers on the dial the amount measured. Then when the measured grain is discharged into a bin or a wagon-bed the bag-holder D is removed, or else its valves are left open, and no further attention is required here, as all these movements are automatic; but when bagging the grain the mouth of the bag is drawn up over the reduced extension D, and the hooks $d\ d$ are thrust outward by a movement of the lever R, so as to secure it there, and, when filled, the bell $e^3$ gives notice thereof by a single stroke, and the attendant depresses the lever R, and thus withdraws the hooks $d\ d$, releasing the grain-bag, and at the same time closes the butterfly-valves at the mouth of D, to prevent the discharge of more grain, and removes and replaces the bag.

Having thus fully described my said invention, what I claim as new, and desire to secure by Letters Patent, is—

1. In an automatic grain-meter, the oscillating buckets L, the rocking shaft G, the vibrating projection J, the fluctuating obstruction K, the governing-spring $k^3$, the adjusting-screw $K^2$, and the graduated scale $k^4$, combined, arranged, and operated substantially as and for the purpose shown and specified.

2. In an automatic grain-meter, the combination, with the oscillating buckets L L, the rocking shaft G, and the vibrating projection J, of a fluctuating obstruction, K, adapted to engage with J by means of a reversible point of engagement, $k$, and prevent each vibration thereof until a given amount of force is applied to the projection J by the weight of the grain in the suspended bucket, then, yielding of itself, allow J to pass it, and, immediately readjusting itself in reversed relation, oppose in like manner its returning vibration, whereby the oscillating buckets are adapted to measure grain by weight, and mechanism for operating the same, substantially as shown and described, and for the purpose set forth.

3. In an automatic grain-meter, the combination of the sliding bar K and its guides, the set-screw $K^2$ and its threaded bearing, the coil-spring $k^3$, operating between them, and the graduated scale $k^4$, whereby a fluctuating device of adjustable and determinate capacity is produced for the ascertainment of the weight of grain, substantially as shown and described, and for the purpose set forth.

4. In an automatic grain-meter containing duplicate vertically-oscillating buckets suspended on opposite sides of a rocking shaft, G, the combination of the rocking shaft G, the fluctuating obstruction K, the reversible point of which successively enters the path of part J and opposes its each vibration until it is forced out thereof by the action of part J, and the projection J, vibrating on a stationary pivot, and bearing a reduced extension at its outer end, beveled at each of its outer angles, so as to form a reversible point for engagement with part K, and adapted to exert a force thereon proportional to the amount of grain in the suspended bucket, and by so doing, when K is properly adjusted and the bucket is filled, force the point of K out of its path and entirely pass it, and encounter it again in like manner, but in a reversed relation, in its returning vibration, substantially as shown and described, and for the purpose set forth.

5. In an automatic grain-meter, a measuring-bucket that has a bottom consisting of a pair of butterfly-valves, or rotary slats pivoted in the lower edge thereof, so that their outer wings are adapted to project slightly under the edges of the bucket to prevent their rising when the grain bears heaviest on the inner and longer wings, which are made to meet near the center of the bucket and entirely close it, and are thus adapted to be opened automatically by the projection P as the filled bucket descends onto it to discharge its contents, substantially as shown and described, and for the purpose set forth.

6. In an automatic grain-meter containing duplicate vertically-oscillating buckets, of which the bottoms consist of adjustable valves which are opened by reciprocating mechanism when the filled buckets are allowed to descend, the combination, with said valves, of the springs $l^2\ l^2$, to close the valves when the buckets are raised, substantially as shown and described, and for the purpose set forth.

7. In an automatic grain-meter having vertically-oscillating buckets with adjustable bottoms, the combination, with the frame or measuring-box thereof, of the projecting blades P, adapted to force open the valves of which said bucket-bottoms consist whenever the filled buckets are allowed to descend onto them, substantially as shown, and for the purpose set forth.

8. In an automatic grain-meter, measurer, and register for grain, the reduced extension or bag-holder D, provided with movable sharpened projections $d$, for holding the grain-bag thereon, substantially as shown and described, and for the purpose set forth.

9. In combination with the bag-holder of an automatic grain-meter, the bell-crank-shaped hooks $d$, pivoted at their angle, and adapted to be thrust outward through the texture of the grain-bag thereon, or withdrawn to release it, as their inner arm is raised or lowered, the lever R, by which they are operated, and the rods $r^2$, by which they are connected with said lever, substantially as shown and described, and for the purpose set forth.

10. In an automatic grain-meter, the combination, with the lower end of the bag-holder thereof, of a set of butterfly-valves, $D^3$, the lever R, and the connecting-wires $r^3$, connected and arranged, and adapted to close the exit-passage from the measurer while replacing the filled grain-bags, substantially as shown and described, and for the purpose set forth.

In witness whereof I have hereunto set my hand and seal, at Crawfordsville, Indiana, this 2d day of April, A. D. 1883.

GEORGE W. SHARP. [L. S.]

In presence of—
HERMAN M. BILLINGS,
JOHN B. ENGLE.